Dec. 12, 1950   G. M. BURNETT   2,533,918
CHAIN TIGHTENING DEVICE
Filed Aug. 19, 1949   2 Sheets—Sheet 1
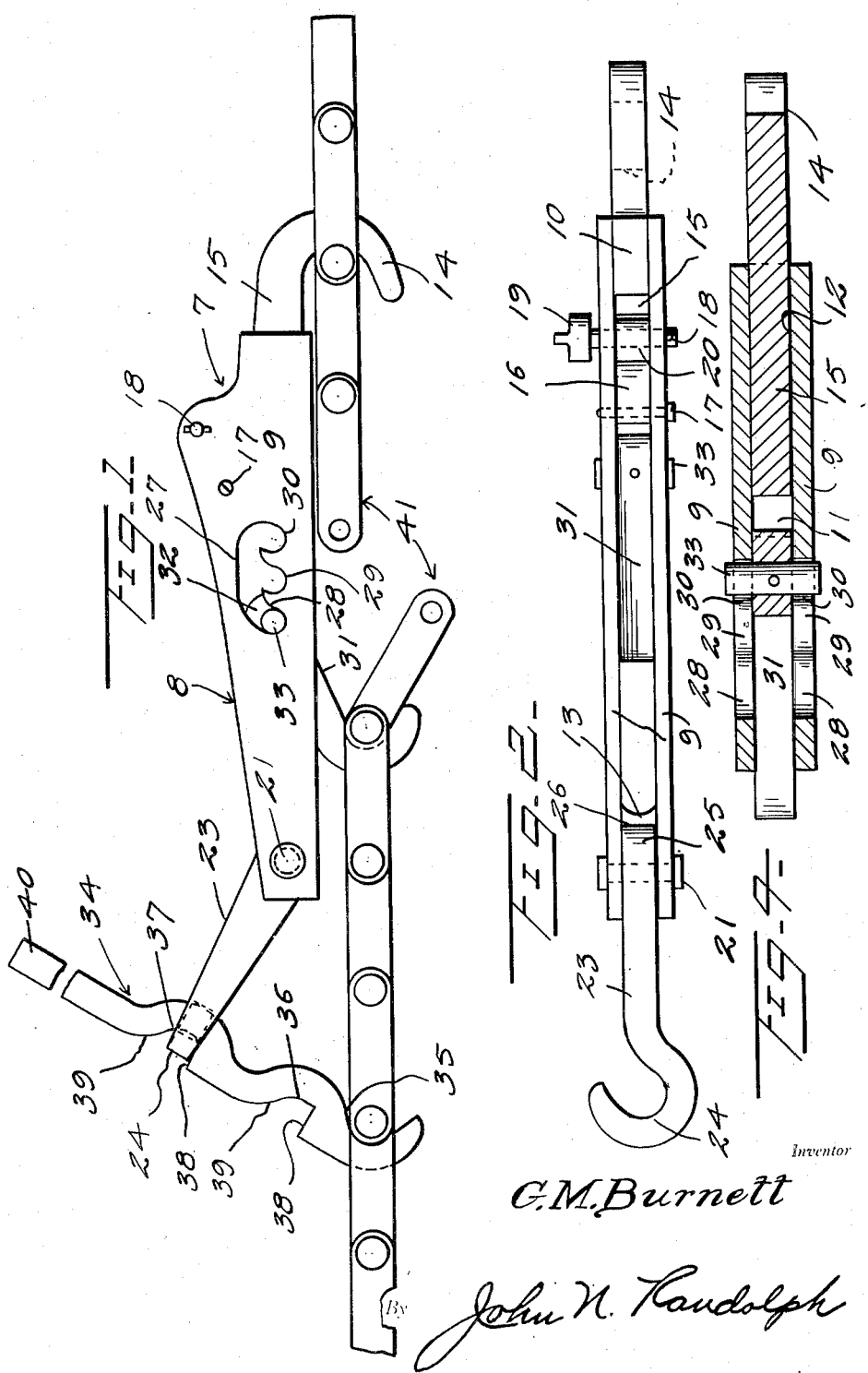
Inventor
G. M. Burnett
By John N. Randolph
Attorney

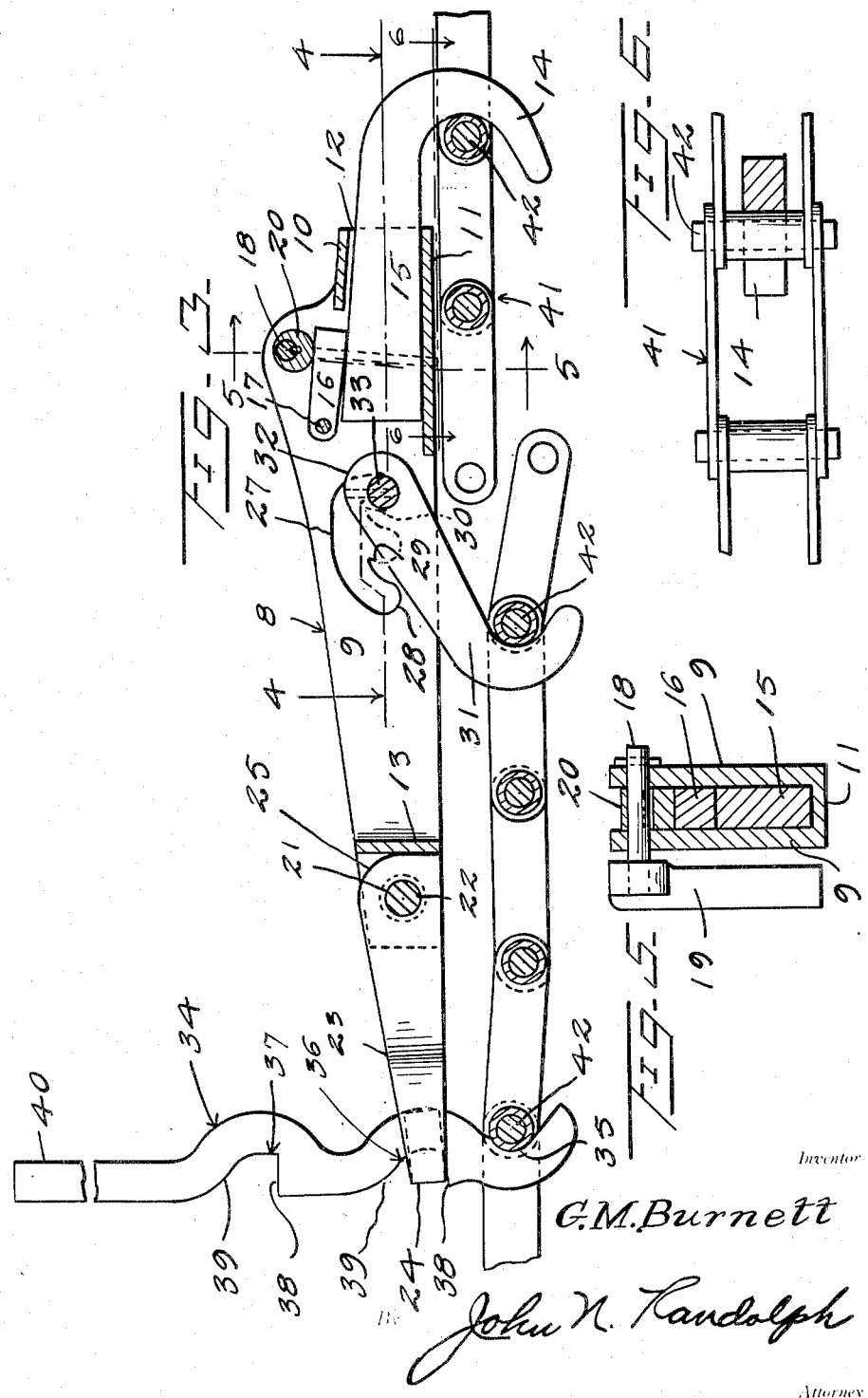

Patented Dec. 12, 1950

2,533,918

UNITED STATES PATENT OFFICE 2,533,918

CHAIN TIGHTENING DEVICE

Goldie M. Burnett, Sweetwater, Tex., assignor of one-half to Roy L. Burnett, Sweetwater, Tex.

Application August 19, 1949, Serial No. 111,203

5 Claims. (Cl. 254—78)

This invention relates to a device for use in tightening a sprocket chain for taking up or shortening the chain, replacing a broken link or repairing a broken chain.

More particularly, it is an aim of the present invention to provide a device capable of being manually operated for tightening a chain and having hook means for holding spaced links of the chain after tightening to prevent said links from moving away from one another so that a broken chain can be repaired or a chain may be shortened.

Various other objects and advantages of the invention will hereinafter become more fully apparent from the following description of the drawings, illustrating presently preferred embodiment thereof, and wherein:

Figure 1 is a side elevational view showing the device in an initially applied position engaging a sprocket chain;

Figure 2 is a top plan view of the device with the lever element thereof removed;

Figure 3 is a longitudinal sectional view of the device in an applied position and as it will appear after the end portions of a chain have been drawn together thereby;

Figure 4 is an enlarged longitudinal sectional view taken substantially along a plane as indicated by the line 4—4 of Figure 3;

Figure 5 is a cross sectional view taken substantially along a plane as indicated by the line 5—5 of Figure 3, and Figure 6 is a horizontal sectional view taken substantially along a plane as indicated by the line 6—6 of Figure 3.

Referring more specifically to the drawings, the sprocket chain tightening device in its entirety is designated generally 7 and includes a housing or body member, designated generally 8 formed of corresponding side walls 9 which are connected adjacent to corresponding ends thereof by a short top wall 10 and a somewhat longer bottom wall 11 which walls 10 and 11 combine with complementary portions of the side walls 9 to form a hook shank receiving housing 12. The walls 9 are connected adjacent to but spaced from their opposite ends by a transverse wall 13.

A chain engaging hook 14 is provided with an elongated shank 15 of rectangular cross section which is reciprocally disposed in the shank receiving housing 12 of the body 8 and with the hook disposed beyond said end of the body and extending downwardly therefrom. The shank 15 is slidably disposed in the housing 12. A clamping bar 16 is pivotally mounted in the body 8 at one end thereof on a pin 17 which extends between the side walls 9 and is disposed inwardly of the top wall 10 and extends from its pivoted end 17 toward said wall 10 and normally rests upon a portion of the upper surface of the hook shank 15. A pin or shaft 18 extends through the side walls 9, above and adjacent the free end of the clamping member 16 and is journaled in said side walls and has a lever 19 fixed to one exposed end thereof. A cam or eccentric 20 is secured to the shaft 18 between the side walls 9 to bear on the clamping member 16 when the shaft is rotated to displace the cam or eccentric 20 downwardly.

The end portions of the side walls 9, beyond the transverse wall 13 are provided with aligned openings for receiving a pin 21 which extends through an opening 22 in the shank end of a hook 23, which shank end is disposed in the space between said side wall portions 9 and beyond the transverse wall 13. The hook portion 24 of the hook 23 is laterally offset with respect to the plane of the hook shank and opens laterally with respect to the plane of the hook shank and the plane of the body member 8, as best illustrated in Figure 2. As seen in Figure 3, the free end of the shank of the hook 23 is provided with a rounded portion 25 to permit said hook to swing upwardly with respect to the body member 8 from its substantially straight, extended position of Figure 3, and has a substantially straight portion 26 disposed below the rounded upper portion 25 which abuts against the transverse wall 13, when the hook 23 is disposed in an extended position relatively to the body 8, to prevent said hook from swinging downwardly beyond its extended position of Figure 3.

The side walls 9, between the transverse wall 13 and the hook shank housing 12 are provided with corresponding, transversely aligned longitudinally extending openings 27 each having three downwardly extending recesses forming upwardly opening notches 28, 29 and 30 which open upwardly at an incline and generally toward the hook shank housing 12. A hook 31 has its shank end 32 disposed between the side walls 9 and a pin 33 is secured therein, intermediate of its ends and has its end portions projecting laterally therefrom and through the openings 27. The pin 33 is sized to slidably engage the openings 27 and rotatably and detachably engage in any one of the notches 28, 29 and 30. The hook 31 and the hook 14 are disposed to open toward one another, as clearly illustrated in Figures 1 and 3.

An elongated lever 34 has an undulating end portion provided adjacent the terminal thereof with a notch 35 forming a hook, which opens in one direction relatively thereto and inwardly therefrom is provided with spaced corresponding notches 36 and 37 which open in the opposite direction and each of which is provided with a substantially straight shoulder 38 which faces inwardly of said undulating end or away from the notch 35 and a rounded opposite end or portion 39. The opposite end of the lever 34 forms the handle 40 and may be of any desired length.

The chain tightening device 7, previously described, is adapted to be used for connecting ends of a sprocket chain, a portion of which is illustrated in Figures 1 and 3 and designated 41, for replacing the pin thereof or a link or for removing a link and tightening the chain, where said sprocket chain is trained over sprocket wheels or the like, not shown, and if it is desirable to repair or tighten the chain without removing it from the sprocket wheels, in view of the difficulty of applying a properly sized chain to spaced sprocket wheels. For either repairing a break in the chain 41 or for tightening said chain, the hook 14 is clamped relatively to the body 8 by swinging the lever 19 downwardly and into a depending position thereby displacing the eccentric portion of the cam 20 downwardly into bearing engagement with the clamping member 16 for swinging said member 16 downwardly on its pivot 17 to clamp the hook shank 15 between the member 16 and the bottom wall 11. The hook 14 is then engaged with one pin 42 of the chain 41, as illustrated in Figures 1 and 3 and adjacent a broken link thereof. The notch 35 of the lever 34 is then engaged with another link 42 of the chain on the other side of and spaced a considerable distance from the break in the chain or the point where a link is to be removed to tighten the chain. Either the notch 36 or the notch 37 is then engaged with the hook portion 24 and the handle 40 of the lever 34 is then grasped for swinging the lever 34 in a counter-clockwise direction on the notch 35 with the pin 42 engaged thereby as a fulcrum from the position of Figure 1 to the position of Figure 3 so that the pins 42 engaged by the hook 14 and the notch 35 will be displaced toward one another. While the broken chain ends are thus held drawn together, with the pin 33 engaging either the aligned notches 28, 29 or 30, the hook 31 may be swung downwardly to engage another link of the chain on the other side of the break in the chain from the hook 14 for thereby holding the broken ends of the chain drawn together when pressure is released on the lever 34. This same result may be accomplished by positioning the pin 33 in engagement with the notches 28 and the hook 31 in engagement with a chain pin 42 before the broken ends of the chain are drawn together by movement of the lever 34 from its position of Figure 1 to its position of Figure 3, in which case, after the broken ends of the chain have been drawn together the shank end 32 of the hook 31 is displaced toward the shank 15 by moving the pin ends thereof from the notches 28 through the openings 27 into engagement with either the notches 29 or the notches 30 and so that the broken chain ends will be held drawn together after pressure on the lever 34 is removed. With the broken chain ends thus held drawn together by the hooks 14 and 31, as illustrated in Figure 3, a broken link may be replaced, a link removed or a chain pin replaced. In order to then disengage the chain tightening device 7 from the chain 41, without again exerting pressure on the chain by use of the lever 34, it is only necessary to swing the lever 19 upwardly to displace the eccentric portion of the cam 20 out of engagement with the clamping member 16 to thereby release the hook shank 15 from a clamped position so that it may be slid outwardly of the hook shank receiving housing 12 to enable the hook 14 to be disengaged from the chain pin 42 engaged thereby, after which the hook 31 may be readily removed from the chain and the lever 34 may obviously be readily disengaged.

Various modifications and changes are contemplated and may obviously be resorted to, without departing from the spirit or scope of the invention as hereinafter defined by the appended claims.

I claim as my invention:

1. A sprocket chain tightening device comprising an elongated body member, a hook having a shank reciprocally disposed in one end of said body member for movement longitudinally thereof and projecting from said end, said hook being adapted to engage a sprocket chain pin on one side of a break therein or a link thereof to be removed or repaired, a manually actuated cam means rotatably mounted in the body member, a clamp engaged by said cam means for clamping said hook shank in the body member in one position of said cam means, a hook pivotally connected to and projecting from the opposite end of said body member, a lever having longitudinally spaced notches adjacent one end thereof for selectively engaging said last mentioned hook and an oppositely spacing notch in the terminal of said end for engaging another pin of the chain on the other side of the link thereof to be repaired or replaced, said last mentioned pin engaging notch facing toward said hook whereby the portions of the chain disposed therebetween will be drawn toward one another when the opposite, handle end of said lever is swung on said second hook as a fulcrum in a direction away from the body member, and a holding hook swingable mounted in the body member and extending downwardly therefrom for engaging another pin of the chain and on the opposite side of the link thereof to be repaired or replaced from the pin engaged by the first mentioned hook, said holding hook being longitudinally displaceable relatively to said body and having means for retaining the holding hook in a plurality of selected longitudinally spaced positions for holding the spaced portions of the chain after said portions have been drawn together by operation of the lever.

2. A chain tightening device as in claim 1, said cam means being releasable for releasing the shank of the first mentioned hook for disengaging the device from the tensioned sprocket chain.

3. A chain tightening device as in claim 1, said body member having parallel side walls provided with corresponding longitudinally extending elongated openings having longitudinally spaced upwardly opening notches defining the bottom portion thereof, and the shank end of said holding hook having trunnions for slidably engaging said openings and for rotatably and detachably engaging the notches for longitudinally displacing the holding hook relatively to the body member.

4. A chain tightening device comprising an elongated body member, a hook having its shank projecting from one end thereof and having a downturned bill portion for engaging a link of a sprocket chain, a fulcrum member projecting from the opposite end of said body member, a pulling lever for swingably engaging said fulcrum member near one end thereof and having a notch in said near end facing toward said hook for engaging another chain link, said lever being adapted to be manually operated for swinging it on the fulcrum member for displacing the notched end thereof toward said hook for drawing the chain links engaged by the hook and lever toward one another, and a holding hook swingably mounted in the intermediate portion of said body and longitudinally displaceable relatively thereto and having means for retaining it in a plurality of longitudinally adjusted positions, said holding hook being adapted to engage another link of the chain and facing the first mentioned hook for holding the links engaged by said hooks against movement away from one another after the chain has been tensioned by operation of the lever.

5. A chain tightening device as in claim 4, the shank of said first mentioned hook being slidably disposed in the body member and longitudinally thereof, and clamping means for releasably clamping the hook shank in the body member.

GOLDIE M. BURNETT.

No references cited.